United States Patent
Bittles et al.

(10) Patent No.: US 10,395,171 B2
(45) Date of Patent: Aug. 27, 2019

(54) PROVIDING EVENT-PROCESSING RULES

(71) Applicant: International Business Machines Corporation, Armonk, NY (US)

(72) Inventors: William Bittles, Hursley (GB);
Jonathan P. Bond, Hursley (GB);
David Granshaw, Hursley (GB);
Daniel J. McGinnes, Hursley (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 467 days.

(21) Appl. No.: 13/894,511

(22) Filed: May 15, 2013

(65) Prior Publication Data

US 2013/0325783 A1    Dec. 5, 2013

(30) Foreign Application Priority Data

May 31, 2012 (GB) .................................. 1209648.3

(51) Int. Cl.
*G06N 5/02* (2006.01)
*G06Q 10/10* (2012.01)

(52) U.S. Cl.
CPC ............... *G06N 5/02* (2013.01); *G06Q 10/10* (2013.01)

(58) Field of Classification Search
CPC .................................. G06N 5/02; G06Q 10/10
See application file for complete search history.

(56) References Cited

U.S. PATENT DOCUMENTS

| | | | |
|---|---|---|---|
| 6,469,629 B1 * | 10/2002 | Campbell | H02H 1/0061 340/635 |
| 2007/0192569 A1 * | 8/2007 | Garnier | G06F 12/0875 712/202 |
| 2008/0167911 A1 | 7/2008 | Hatakeda | |
| 2009/0192904 A1 | 7/2009 | Patterson et al. | |
| 2010/0017328 A1 | 1/2010 | Stephen et al. | |
| 2010/0274687 A1 | 10/2010 | Ghosh et al. | |

(Continued)

FOREIGN PATENT DOCUMENTS

| | | | | |
|---|---|---|---|---|
| EP | 2407917 A1 * | 1/2012 | ............... | G06N 5/02 |
| EP | 2407917 A1 * | 1/2012 | ............... | G06N 5/02 |

OTHER PUBLICATIONS

Schiefer, Josef, et al. "Event-driven rules for sensing and responding to business situations." Proceedings of the 2007 inaugural international conference on Distributed event-based systems. ACM, 2007.*

(Continued)

*Primary Examiner* — Scott A. Waldron
*Assistant Examiner* — Kevin W Figueroa
(74) *Attorney, Agent, or Firm* — Cantor Colburn LLP; David Woycechowsky

(57) ABSTRACT

A method and system are provided for providing event-processing rules in an event-processing environment. The method includes providing at least one generalised event-processing rule to a customer, receiving customer input of rule customization to produce a customized rule, and storing the customized rule in Polish notation for processing using stack-based processing. The method also includes receiving notification of an event for a customer, retrieving a customized rule relating to the customer, and processing the customized rule using stack-based processing.

20 Claims, 5 Drawing Sheets

(56) References Cited

U.S. PATENT DOCUMENTS

2010/0312657 A1    12/2010  Coulter et al.
2011/0131245 A1     6/2011  Huang et al.
2011/0231936 A1*  9/2011  Williams .............. G06F 21/577
                                                                         726/25

OTHER PUBLICATIONS

LogicORGate [2010] retrieved on May 30, 2017 [https://web.archive.org/web/20100311051324/http://www.electronics-tutorials.ws/logic/logic_3.html].*
Multi-Input Logic Gates 2006.*
Sheng et al., "Customer Requirements Mapping Method Based on Association Rules Mining for Mass Customisation", International J. Computer Applications in Technology, vol. 37, Nos. 3/4, 2010, pp. 198-203.

* cited by examiner

PROVIDING EVENT-PROCESSING RULES

PRIORITY

The application claims priority to Great Britain Patent Application No. 1209648.3 filed May 31, 2012, and all the benefits accruing therefrom under 35 U.S.C. § 119, the contents of which in its entirety are herein incorporated by reference.

BACKGROUND

The present invention relates generally to event-processing rules. In particular, the present invention relates to providing event-processing rules in an event-processing environment.

Organizations may wish to offer their customers the ability to write their own individual event-processing rules, which can be applied during run time. However, when an organization has a large number of customers, this can result in a requirement for hundreds of thousands of individual rules. Managing large amounts of rules can be difficult to manage effectively and can also carry significant performance penalties.

For example, consider the case where a bank customer wishes to be notified whenever a large debit (>£200) arrives and their account is currently overdrawn. The customer may wish to receive an SMS message if the account is more than £500 overdrawn and an email if it is up to £500 overdrawn. The rule for the email part of this scenario may be written as:

if (−£500<balance<£0) AND transaction>£200 then send notification (email) to customer.

There are two existing options to represent this kind of information for hundreds of thousands customers. The first option is for every customer to have his or her own individual rules, which results in hundreds of thousands of rules. The second option is for the rule to be parameterized in the form of:

if −$A$<balance<$B$ and transaction>$C$.

In this case there may be one rule and the values of A, B and C may simply be stored for each customer. This solution may work for a limited number of parameters and operands. However, if true flexibility of operators is allowed (e.g. <, >, =, !=, >=, <=, <>) and any number of logical expressions are allowed to be concatenated, then it will still require thousands of rules or parameterized expressions to be written to cover all possible cases. This is made worse if further parameters are introduced.

SUMMARY

Embodiments include methods, computer program products, and systems for providing event-processing rules in an event-processing environment. A method includes providing at least one generalised event-processing rule to a customer, receiving customer input of rule customisation to produce a customized rule, and storing the customized rule in Polish notation for processing using stack-based processing.

A system for providing event-processing rules in an event-processing environment includes a rule providing component for providing at least one generalised event-processing rule to a customer, a rule customisation component for receiving customer input of rule customisation to produce a customized rule, a database for storing the customised rule in Polish notation, and an event-processing component for processing the customised rule using stack-based processing.

A computer program product for providing event-processing rules in an event-processing environment includes a computer readable storage medium having computer-readable program code embodied therewith, the computer-readable program code configured to provide at least one generalised event-processing rule to a customer, receive customer input of rule customisation to produce a customised rule, and store the customised rule in Polish notation for processing using stack-based processing.

BRIEF DESCRIPTION OF THE SEVERAL VIEWS OF THE DRAWINGS

The subject matter regarded as the invention is particularly pointed out and distinctly claimed in the concluding portion of the specification. The invention, both as to organization and method of operation, together with features, and advantages thereof, may best be understood by reference to the following detailed description when read with the accompanying drawings.

Preferred embodiments of the present invention will now be described, by way of example only, with reference to the following drawings in which.

DETAILED DESCRIPTION OF THE EMBODIMENTS

Figure 1:
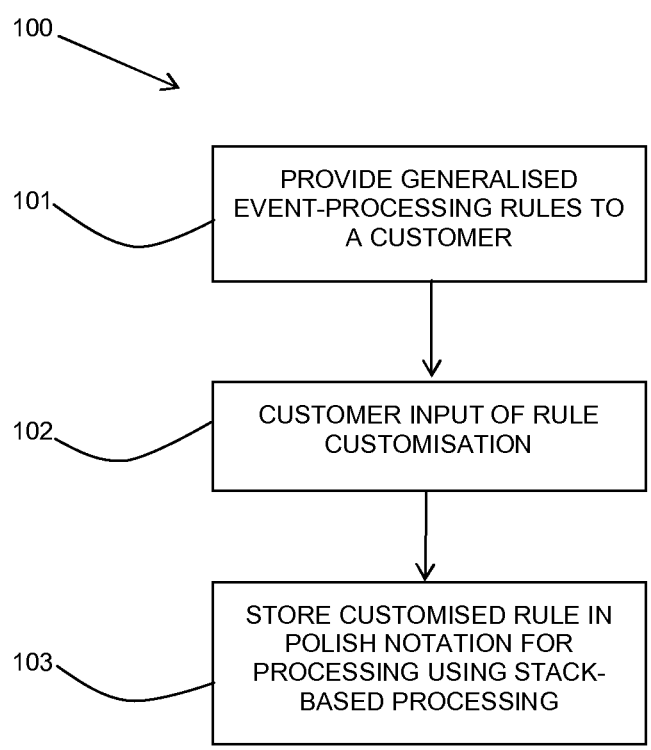
FIG. 1 is a flow diagram of an example embodiment of a method in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Embodiments of the invention are described for providing event-processing rules in which the use of generalized rules and stack processing enable customers to set up individual processing rules in an event-processing environment. The described embodiments of the invention provide the advantage of reducing memory and processing time of customer's individual rules in a business environment. They also allow hundreds of thousands of individual business rules to be represented by a few general rules and stores the customer rule information in a portable and easily readable format.

Customer rules may be stored in Polish notation based on underlying generalised event rules and processed using a stack-based approach.

Polish notation, also known as Polish prefix notation or simply prefix notation, is a form of notation for logic, arithmetic, and algebra. Its distinguishing feature is that it places operators to the left of their operands. If the arity of the operators is fixed, the result is a syntax lacking parentheses or other brackets that can still be parsed without ambiguity.

This is different to infix notation, which is the common arithmetic and logical formula notation, in which operators are written between the operands they act on. In infix notation, unlike Polish notation (prefix or postfix), parentheses surrounding groups of operands and operators are necessary to indicate the indented order in which operations are to be performed. In the absence of parentheses, precedence rules determine the order of operations.

Reverse Polish notation or postfix notation is notation in which the operator is placed after the operands.

The term "Polish notation" is used herein to include both prefix and postfix notation (Reverse Polish notation).

Polish notation is especially popular with stack-based operations due to its innate ability to easily distinguish order of operations without the need for parentheses.

A stack is a kind of buffer which provides very limited access to its ordered elements. The elements of a stack are ordered in the sequence in which those elements were added to the stack. Access to the stack is only allowed through the most recent or "top" element of the stack. There are basically three operations which may be performed on a stack: the top-most element may be matched; an element may be "pushed" onto the top of the stack (thus obscuring the previous top element); and an element may be popped off the top of the stack (thus revealing a previously hidden element).

Polish notation is popular with stack-based operations due to its innate ability to easily distinguish order of operations without the need for parentheses. To evaluate order of operations under prefix notation, one looks directly to the notation to discover which operator to evaluate first. Reading an expression from left to right, one first looks for an operator and proceeds to look for two operands. If another operator is found before two operands are found, then the old operator is placed aside until this new operator is resolved. This process iterates until an operator is resolved, which must happen eventually, as there must be one more operand than there are operators in a complete statement. Once resolved, the operator and the two operands are replaced with a new operand. Because one operator and two operands are removed and one operand is added, there is a net loss of one operator and one operand, which still leaves an expression with N operators and N+1 operands, thus allowing the iterative process to continue. This is the general theory behind using stacks in programming languages to evaluate a statement in Polish notation, although there are various algorithms that manipulate the process.

The following is an example implementation (in pseudo code) of Polish notation evaluation using a stack. Note that under this implementation the input string is scanned from right to left.

```
Scan the given prefix expression from right to left
for each symbol
    {
        if operand then
            push onto stack
        if operator then
            {
                operand1=pop stack
                operand2=pop stack
                compute operand1 operator operand2
                push result onto stack
            }
    }
return top of stack as result
```

Referring to FIG. 1, a flow diagram 100 shows an example embodiment of the described method of providing event-processing rules in an event-processing environment.

One or more generalized event-processing rules are provided 101 which are made available to a customer, for example, via a user interface. The customer may input 102 customization of a generalized rule to generate a customer-specific equation or function referred to as a customized rule. The customized rule may be stored 103 in Polish notation for processing using stack-based processing. The generalized event-processing rules may be provided in Polish notation or may be provided in another form of notation and converted to Polish notation after customization.

Figure 2:
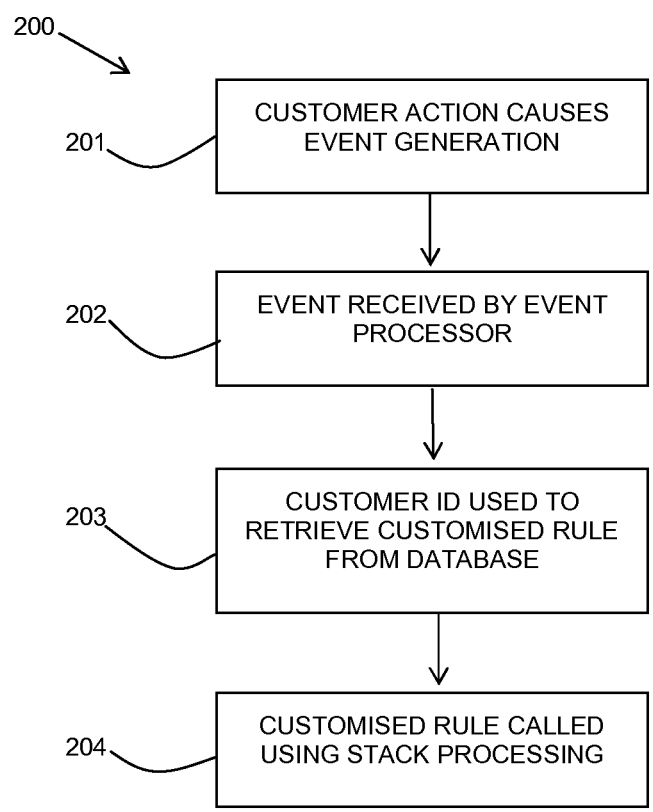
FIG. 2 is block diagram of an example embodiment of a system in accordance with the present invention.

Referring to FIG. 2, a flow diagram 200 shows an example embodiment of the described method of providing event-processing rules in an event-processing environment at runtime.

A customer action may cause 201 an event generation (for example, a cash withdrawal). The event may be received 202 by an event processor. The customer ID may be used 203 to retrieve a customized rule from a stored location such as a database. The customized rule may then be called using stack processing.

The example rule given above of "if (−£500<balance<£0) AND transaction>£200 then send notification (email) to customer" would be written simply as follows and executed twice:

[event field] [arithmetic operator] [operand 1] [operand 2] [logical operator]

The first time through the event would be:
[event field]=balance
[arithmetic operator]=<<
[operand 1]=−500
[operand 2]=0
[logical operator]=AND and the second time through processing the event would be:
[event field]=transaction
[arithmetic operator]=>
[operand 1]=200
[operand 2]=anything—it will be ignored as only one operand is required for 'greater than'
[logical operator]=END—just to signal the end of the expression The stack processing approach means there is only a need to write one set of relatively simple rules and then call them repeatedly using a series of new events, shifting the event parameters on each iteration.

Filters may then be applied, in the described example these may be of the form:
If arithmeticOperator=">" and BusinessEventField>operand 1 then outcome=true
else if arithmeticOperator="<" and BusinessEventField<operand 1 then outcome=true else if arithmeticOperator="<<" and operand
   1<BusinessEventField<operand 2 then outcome=true
else if arithmeticOperator=">>" and operand
   1>BusinessEventField>operand 2 then outcome=true
else if arithmeticOperator="=" and
   BusinessEventField=operand 1 then outcome=true
else if arithmeticOperator="!=" and
   BusinessEventField!=operand 1 then outcome=true
else outcome=false To cover all arithmetical operators only takes a few filters to implement.

The customer specific rule may be generated, for example, by a web user interface (UI). The customer may select the criteria from the web UI, which would store the information in the required form. For example, the customer specific rule above would be stored as: "balance, <<, −500, 0,AND,transaction, >, 200,0,END".

Figure 3:
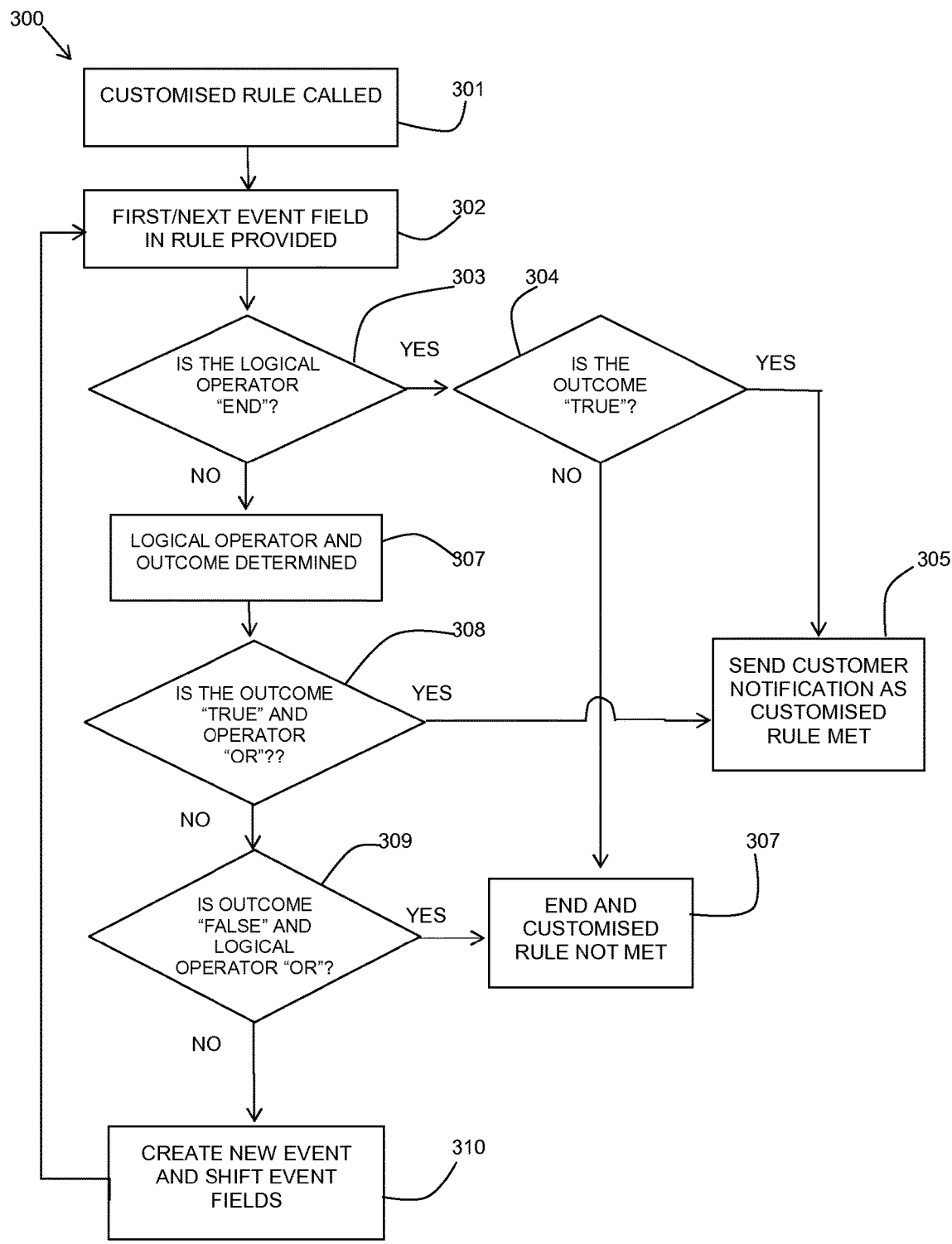
FIG. 3 is a block diagram of an embodiment of a computer system in which the present invention may be implemented.

Referring to FIG. 3, a flow diagram 300 shows an example embodiment of a stack processing of a customized rule. A customized rule may be called 301.

A first event field in the rule may be provided 302. The filters shown above are called using stack processing. The outcome will be true or false.

An example flow is shown to illustrate the processing of a rule, however such processing may take many different forms with logical operator and outcome determinations in different orders.

In this example, it is then determined 303 if the logical operator is "end". If so, it is then determined if the outcome is "true". If so, the customer is sent 305 a notification as the customized rule has been met. If not, the processing ends 306 as the customized rule has not been met.

However, at the determination 303 of whether the logical operator is "end", if the logical operator is not "end", the logical operator and the outcome are then determined 307. At this point a number of processing optimizations could be made, for example, taking the "and" and "or" operations.

In this example, it is shown that it is determined 308 if the outcome is "true" and the logical operator is "or" then the processing ends 305 as the customized rule has been met. It may then be determined 309, if the outcome is "false" and the logical operator is "and" the processing ends 306 as the customized rule has not been met.

Any other combinations are not special cases, for example, this leaves the two options of the outcome being "true" and the logical operator being "and", or the outcome being "false" and the logical operator being "or". In these remaining cases a new event is created and the event fields are shifted 310 and the process loops to the next event field provided 302 in the rule.

The rule processing may be described as follows:
The first time through, in the given example, the event fields are set to "balance, <<, −500,0,AND"

```
If the logical operator is "END" {    //there are no more
operations to perform
   If (outcome is true) then send customer notification (e.g. email)
//all other customer criteria must have been met or processing would have
stopped before now
      // else there is nothing to do. The end of processing has been
         reached and the
customer criteria were not met
   }else                //example optimization for "OR"
   If (outcome = true and logical operator ="OR") then send customer
notification (e.g. email) //this is an optimization - if one side of the "or"
operation is true, do not need to evaluate the second half. The
outcome will be true.
   }else                //example optimization for "AND"
   If (outcome = false and logical operator = "AND") then customer
criteria were not met
      // this is an optimization - if one side of the "and" operation is
false we do not need to evaluate the second half. The outcome
will be false.
   }else    // any optimizations for other logical operators
   }else              //no special cases, so continue
                         processing
      create a new event and shift all the initial fields //so in the example
case the relevant fields would now be set to "transaction,
>, 200,0,END"
   }
```

The same small set of business rules are repeated until it is determined whether or not the customer criteria have been met.

Thus in a handful of business rules, all rules of the following form have been covered:
  [event field] [arithmetic operator] [operand 1] [operand 2] [logical operator]
  [event field] [arithmetic operator] [operand 1] [operand 2] . . . [event field] [arithmetic operator] [operand 1] [operand 2]

This is an example and the principle of stack-based analysis for event-processing could be extended to include much longer expressions in a similar manner.

Another example may be a stock trading application which may allow traders to write individual rules to generate alerts when interesting market conditions occur, such as: 'if (symbol=IBM) AND (NumberOfSells >10000) AND (priceChange >1)'.

The described method and system may replace hundreds of thousands of rules with a very small number (10 or 20) of simple business rules using a stack-based approach. The rules are also potentially portable across event products.

Figure 4:
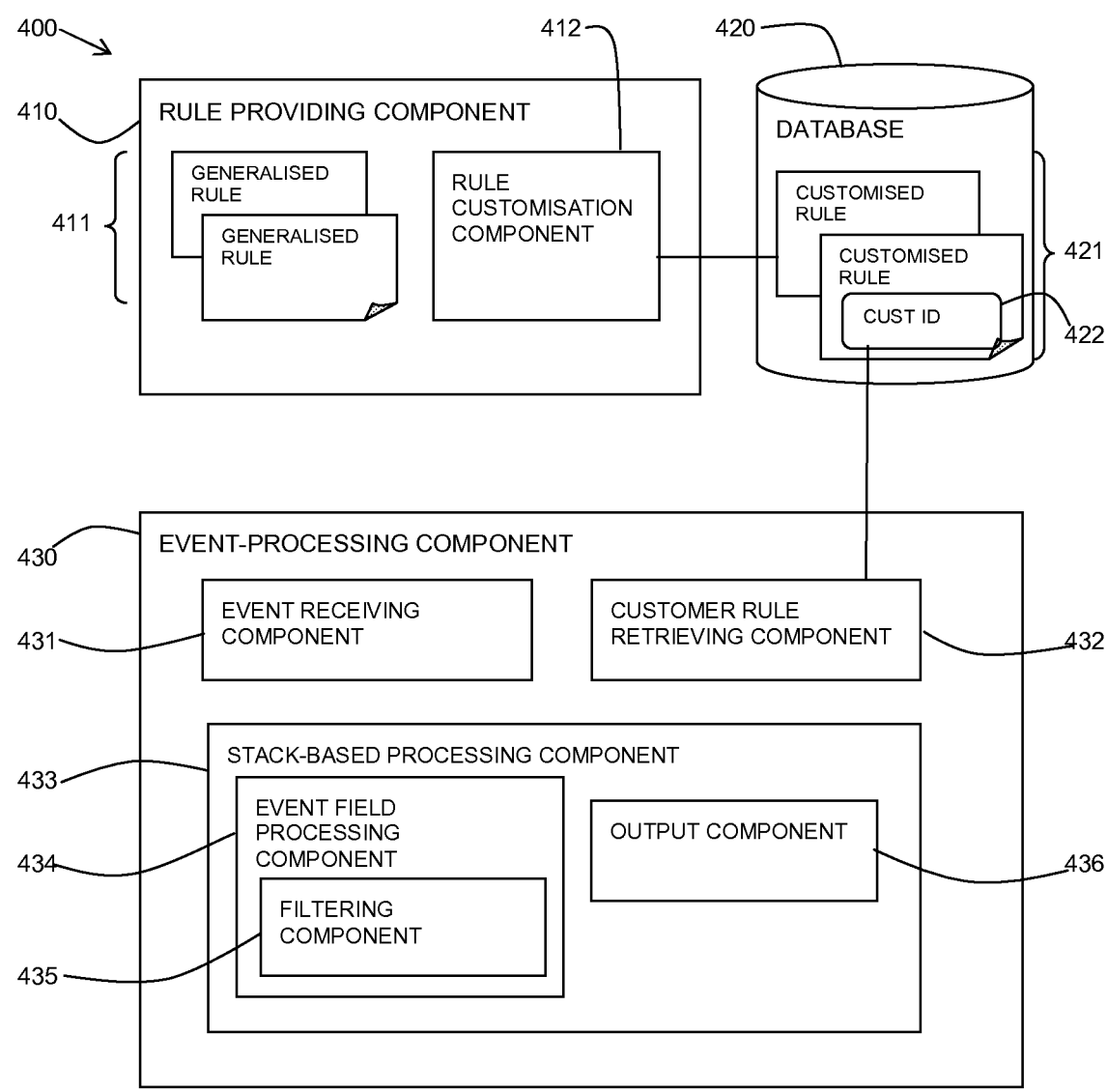
FIG. 4 is a flow diagram of an example embodiment of an aspect of a method in accordance with the present invention.

Referring to FIG. 4, a block diagram shows an example embodiment of the described system 400.

A rule providing component 410 may include multiple generalized rules 411 and a rule customization component 412 which receives rule customizing input from a customer. The rule customization component 412 may be provided as a web user interface. Customized rules 421 may be stored in a database 420 and referenced by a customer ID 422. The database 421 may be accessed locally or via a network. The customized rules 421 may be converted to or generated in Polish notation.

An event-processing component 430 is provided comprising an event receiving component 431 for receiving an event, for example, generated by a customer action. A customer rule retrieving component 432 may be provided for retrieving a customized rule 421 from the database 420 referenced by a customer ID 422 of the received event.

The event-processing component 430 may include a stack-based processing component 433 for processing a customized rule 421 using stack-based processing of the Polish notation of the rule. A customized rule may have multiple event fields and an event field processing component 434 may process these using a filtering component 435. The event field processing component 434 may iterate filtering through each event field until the outcome of the customized rule is determined. An output component 436 may be provided to notify a customer of a rule outcome, as required.

Figure 5:
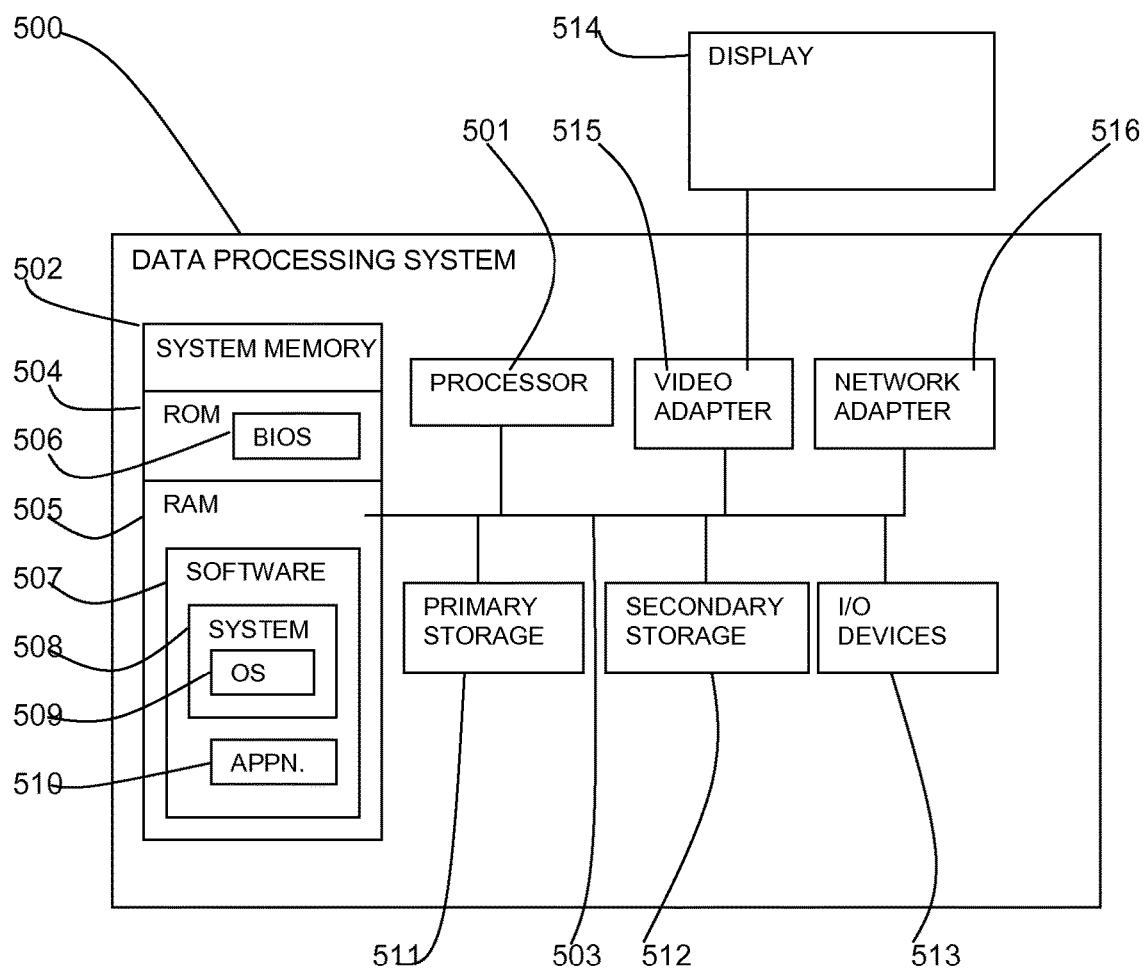
FIG. 5 is a flow diagram of an example embodiment of an aspect of a method in accordance with the present invention.

Referring to FIG. 5, an exemplary system for implementing aspects of the invention comprises a data processing system 500 suitable for storing and/or executing program code comprising at least one processor 501 coupled directly or indirectly to memory elements through a bus system 503. The memory elements may include local memory employed during actual execution of the program code, bulk storage, and cache memories which provide temporary storage of at least some program code in order to reduce the number of times code must be retrieved from bulk storage during execution.

The memory elements may include system memory 502 in the form of read only memory (ROM) 504 and random access memory (RAM) 505. A basic input/output system (BIOS) 506 may be stored in ROM 504. System software 507 may be stored in RAM 505 comprising operating system software 508. Software applications 510 may also be stored in RAM 505.

The system 500 may also include a primary storage means 511 such as a magnetic hard disk drive and secondary storage means 512 such as a magnetic disc drive and an optical disc drive. The drives and their associated computer-readable media provide non-volatile storage of computer-executable instructions, data structures, program modules and other data for the system 500. Software applications may be stored on the primary and secondary storage means 511, 512 as well as the system memory 502.

The computing system 500 may operate in a networked environment using logical connections to one or more remote computers via a network adapter 516.

Input/output devices 513 may be coupled to the system either directly or through intervening I/O controllers. A user may enter commands and information into the system 500 through input devices such as a keyboard, pointing device, or other input devices (for example, microphone, joy stick, game pad, satellite dish, scanner, or the like). Output devices may include speakers, printers, etc. A display device 514 is also connected to system bus 503 via an interface, such as video adapter 515.

The invention can take the form of an entirely hardware embodiment, an entirely software embodiment or an embodiment containing both hardware and software elements. In a preferred embodiment, the invention is implemented in software, which comprises but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

What is claimed is:

1. A method of storing a plurality of general rules capable of representing a larger plurality of customized rules as computer readable data on computer data storage hardware in a storage space efficient manner that does not require storing all of the larger plurality of customized rules, the method comprising:
   determining a plurality of rule expression parameters including at least: an event field, an arithmetic operator, a first operand, and a logical operator;
   determining an order for the plurality of rule expression parameters;
   storing the plurality of rule expression parameters in the determined order as a particular general rule of the plurality of general rules; and
   generating a first customized rule from the particular general rule at least in part by determining a first respective parameter value for each rule expression parameter of the plurality of rule expression parameters;
   storing, on the computer data storage hardware, each determined first parameter value in the determined order;
   generating a second customized rule from the particular general rule at least in part by determining a second respective parameter value for each rule expression parameter of the plurality of rule expression parameters;
   storing, on the computer data storage hardware, each determined second parameter value in the determined order;
   executing the first customized rule at least in part by calling the particular general rule and applying the particular general rule using each first respective parameter value specified by the first customized rule in accordance with the determined order; and
   executing the second customized rule at least in part by calling the particular general rule a second time, shifting each rule expression parameter from a corresponding first respective parameter value specified by the first customized rule to a corresponding second respective parameter value specified by the second customized rule, and applying the particular general rule using each second respective parameter value in accordance with the determined order.

2. The method of claim 1, wherein executing the first customized rule comprises:
   constructing a set of machine readable code expressing the first customized rule based on each first respective parameter value of the first customized rule and the determined order of the plurality of rule expression parameters; and
   applying the particular general rule by executing the set of machine readable code expressing the first customized rule.

3. The method of claim 2, further comprising determining an outcome of executing the set of machine readable code expressing the first customized rule.

4. The method of claim 3, wherein determining the outcome comprises determining that the outcome is TRUE, the method further comprising sending a notification to a user associated with the first customized rule.

5. The method of claim 2, further comprising:
   determining a type of the logical operator; and
   determining a rule execution optimization corresponding to the type of the logical operator,
   wherein applying the particular general rule comprises executing only a portion of the set of machine readable code based at least in part on the rule execution optimization.

6. The method of claim 1, wherein the plurality of rule expression parameters further includes a second operand.

7. The method of claim 6, wherein a first parameter value of the first operand and a second parameter value of the second operand are customized values specified by a user.

8. A system for storing a plurality of general rules capable of representing a large plurality of customized rules as computer readable data on computer data storage hardware in a storage space efficient manner that does not require storing all of the larger plurality of customized rules, the system comprising:
  at least one memory storing computer-executable instructions; and
  at least one processor configured to access the at least one memory and execute the computer-executable instructions to:
    determine a plurality of rule expression parameters including at least: an event field, an arithmetic operator, a first operand, and a logical operator;
    determine an order for the plurality of rule expression parameters;
    store the plurality of rule expression parameters in the determined order as a particular general rule of the plurality of general rules; and
    generate a first customized rule from the particular general rule at least in part by determining a first respective parameter value for each rule expression parameter of the plurality of rule expression parameters;
    store, on the computer data storage hardware, the first customized rule by storing each determined first parameter value in the determined order:
    generate a second customized rule from the particular general rule at least in part by determining a second respective parameter value for each rule expression parameter of the plurality of rule expression parameters;
    store, on the computer data storage hardware, the second customized rule by storing each determined second parameter value in the determined order;
    execute the first customized rule at least in part by calling the particular general rule and executing the particular general rule using each first respective parameter value specified by the first customized rule in accordance with the determined order; and
    execute the second customized rule at least in part by calling the particular general rule a second time, shifting each rule expression parameter from a corresponding first respective parameter value specified by the first customized rule to a corresponding second respective parameter value specified by the second customized rule, and executing the particular general rule using each second respective parameter value in accordance with the determined order.

9. The system of claim 8, wherein the at least one processor is configured to execute the first customized rule by executing the computer-executable instructions to:
  construct a set of machine readable code expressing the first customized rule based on each first respective parameter value of the first customized rule and the determined order of the plurality of rule expression parameters; and
  apply the particular general rule by executing the set of machine readable code expressing the first customized rule.

10. The system of claim 9, wherein the at least one processor is further configured to execute the computer-executable instructions to determine an outcome of executing the set of machine readable code expressing the first customized rule.

11. The system of claim 10, wherein the at least one processor is configured to determine the outcome by executing the computer-executable instructions to determine that the outcome is TRUE, and wherein the at least one processor is further configured to execute the computer-executable instructions to send a notification to a user associated with the first customized rule.

12. The system of claim 9, wherein the at least one processor is further configured to execute the computer-executable instructions to:
  determine a type of the logical operator; and
  determine a rule execution optimization corresponding to the type of the logical operator,
    wherein the at least one processor is configured to apply the particular general rule by executing only a portion of the set of machine readable code based at least in part on the rule execution optimization.

13. The system of claim 8, wherein the plurality of rule expression parameters further includes a second operand, and wherein a first parameter value of the first operand and a second parameter value of the second operand are customized values specified by a user.

14. A computer program product for storing a plurality of rules as computer readable data on computer data storage hardware in a storage space efficient manner, the computer program product comprising a non-transitory computer-readable storage medium having computer-readable program instructions embodied therewith that are executable by at least one processor to perform a method comprising:
  determining a plurality of rule expression parameters including at least: an event field, an arithmetic operator, a first operand, and a logical operator;
  determining an order for the plurality of rule expression parameters;
  storing the plurality of rule expression parameters in the determined order as a particular general rule of the plurality of general rules; and
  generating a first customized rule from the particular general rule at least in part by determining a first respective parameter value for each rule expression parameter of the plurality of rule expression parameters;
  storing, on the computer data storage hardware, the first customized rule by storing each determined first parameter value in the determined order;
  generating a second customized rule from the particular general rule at least in part by determining a second respective parameter value for each rule expression parameter of the plurality if rule expression parameters;
  storing, on the computer data storage hardware, the second customized rule by storing each determined second parameter value in the determined order;
  executing the first customized rule at least in part by calling the particular general rule and executing the particular general rule using each first respective parameter value specified by the first customized rule in accordance with the determined order; and
  executing the second customized rule at least in part by calling the particular general rule a second time, shifting each rule expression parameter from a corresponding first respective parameter value specified by the first customized rule to a corresponding second respective parameter value specified by the second customized rule, and executing the particular general rule using each second respective parameter value in a accordance with the determined order.

15. The computer program product of claim 14, wherein executing the first customized rule comprises:
   constructing a set of machine readable code expressing the first customized rule based on each first respective parameter value of the first customized rule and the determined order of the plurality of rule expression parameters; and
   applying the particular general rule by executing the set of machine readable code expressing the first customized rule.

16. The computer program product of claim 15, the method further comprising determining an outcome of executing the set of machine readable code expressing the first customized rule.

17. The computer program product of claim 16, wherein determining the outcome comprises determining that the outcome is TRUE, the method further comprising sending a notification to a user associated with the first customized rule.

18. The computer program product of claim 15, the method further comprising:
   determining a type of the logical operator; and
   determining a rule execution optimization corresponding to the type of the logical operator,
   wherein applying the particular general rule comprises executing only a portion of the set of machine readable code based at least in part on the rule execution optimization.

19. The computer program product of claim 14, wherein the plurality of rule expression parameters further includes a second operand.

20. The computer program product of claim 19, wherein a first parameter value of the first operand and a second parameter value of the second operand are customized values specified by a user.

* * * * *